United States Patent [19]

Dragone

[11] Patent Number: 5,412,744
[45] Date of Patent: May 2, 1995

[54] FREQUENCY ROUTING DEVICE HAVING A WIDE AND SUBSTANTIALLY FLAT PASSBAND

[75] Inventor: Corrado Dragone, Little Silver, N.J.

[73] Assignee: AT&T Corp., Murray Hill, N.J.

[21] Appl. No.: 238,074

[22] Filed: May 2, 1994

[51] Int. Cl.⁶ .............................................. G02B 6/28
[52] U.S. Cl. .................................. 385/24; 385/37; 385/45
[58] Field of Search ................. 385/24, 31, 37, 39, 385/45

[56] References Cited

U.S. PATENT DOCUMENTS

| | | | |
|---|---|---|---|
| 4,904,042 | 2/1990 | Dragone | 385/46 |
| 5,002,350 | 3/1991 | Dragone | 359/124 |
| 5,039,993 | 8/1991 | Dragone | 343/776 |
| 5,136,671 | 8/1992 | Dragone | 385/46 |
| 5,339,157 | 8/1994 | Glance et al. | 385/24 |

Primary Examiner—Frank Gonzalez
Attorney, Agent, or Firm—Stuart H. Mayer

[57] ABSTRACT

We describe a technique for producing a flat passband in a wavelength multiplexer. We obtain this by combining two output waveguides, and by optimizing their parameters so as to produce a maximally flat passband with minimal loss. The optimum parameters are obtained, to a good approximation, by choosing each output waveguide so that its mode approximately matches the input waveguide mode (see page 9 on) and by choosing the spacing of the two waveguides so that the multiplexer transmission coefficient at the edges of the passband is approximately equal to the value at the center of the passband. We also include, in the multiplexer, additional waveguides that allow the center wavelength of the passband to be varied in steps of S/Q, where S is the channel spacing and δ is an integer exceeding the number of channels (multiple control input waveguides). As a result, we obtain a unique arrangement, suitable for realization in integrated form using waveguide arrays. The arrangement is characterized by flat passbands, by high levels of rejection in the stopbands, and it has additional waveguides that allow multiple choices for the wavelengths of the various channels, without affecting the spacing and width of the channels. By properly selected the input and output waveguides,any desired channel wavelength can be selected., with errors less than S/(2δ). This is expected to be an important feature because current technologies cannot control the channel wavelength with the accuracy (of less than a nanometer) that is typically required for long haul and local area networks.

7 Claims, 7 Drawing Sheets

FREQUENCY ROUTING DEVICE HAVING A WIDE AND SUBSTANTIALLY FLAT PASSBAND

FIELD OF THE INVENTION

This invention relates to an optical interconnection apparatus which is capable of optical switching, multiplexing, and demultiplexing functions. More particularly, this invention relates to an optical interconnection apparatus that has a wide and substantially flat passband.

BACKGROUND OF THE INVENTION

Optical switching, multiplexing, and demultiplexing have been accomplished in the past by using an interconnection apparatus having a plurality of closely spaced input waveguides communicating with the input of a star coupler. The output of the star coupler communicates with an optical grating comprising a series of optical waveguides, each of the waveguides differing in length with respect to its nearest neighbor by a predetermined fixed amount. The grating is connected to the input of a second star coupler, the outputs of which form the outputs of the switching, multiplexing, and demultiplexing apparatus. An example of such an interconnection apparatus is disclosed in U.S. Pat. Nos. 5,002,350 and 5,136,671.

The geometry of such an apparatus may be such that a plurality of separate and distinct wavelengths each launched into a separate and distinct input port of the apparatus will all combine and appear on a predetermined one of the output ports. In this manner, the apparatus performs a multiplexing function. The same apparatus may also perform a demultiplexing function. In this situation, a plurality of input wavelengths is directed to a predetermined one of the input ports of the apparatus. Each of the input wavelengths is separated from the others and directed to a predetermined one of the output ports of the apparatus. An appropriate selection of input wavelength also permits switching between any selected input port to any selected output port. Accordingly, these devices are referred to as frequency routing devices.

Known frequency routing devices do not efficiently provide a flat passband between a distinct one of the input ports and a distinct one of the output ports. Moreover, it is difficult to selectively choose the center wavelength of the passbands.

It is, therefore, an object of this invention to provide a frequency routing device having a flat passband that is as wide as possible with minimal loss, while at the same time providing grater flexibility in choosing the center wavelength of the passbands.

DETAILED DESCRIPTION

Figure 1:
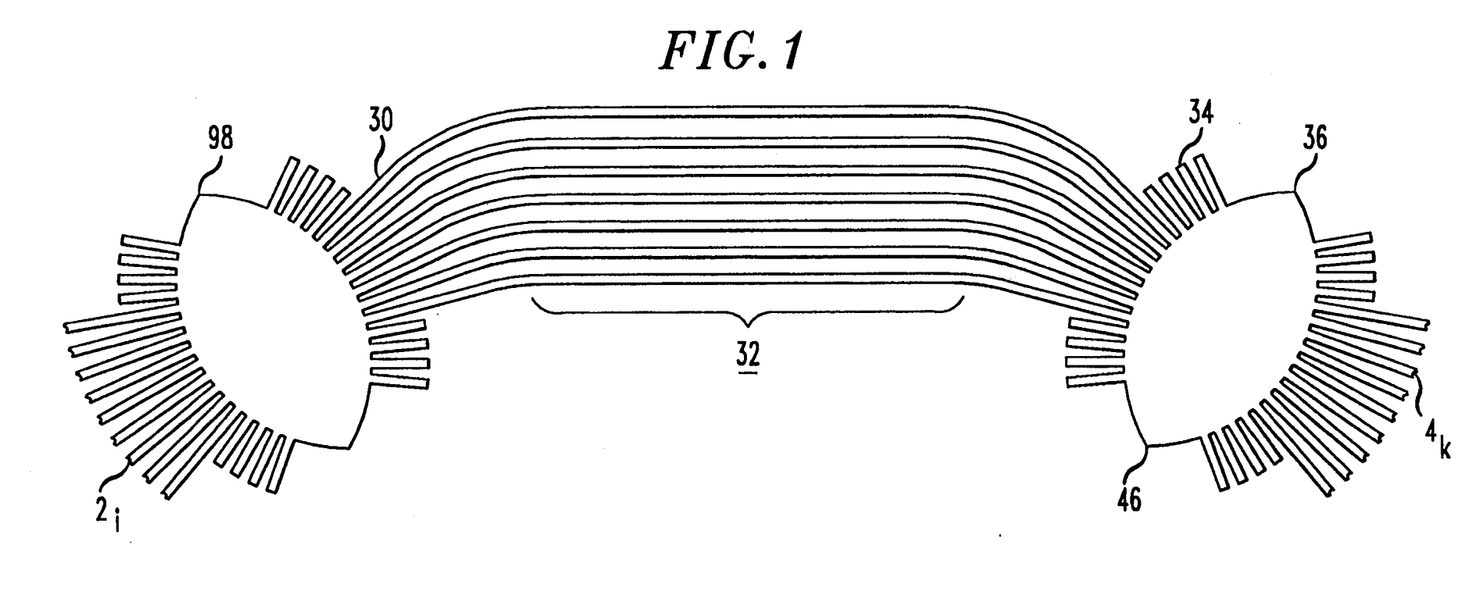
FIG. 1 illustrates an example of a conventional optical frequency routing device.

FIG. 1 shows the pertinent details of a conventional frequency routing device. The frequency routing device contains a plurality of input waveguides $2_i$, i=1, 2, ..., N connected to a free space region 98. A plurality of output waveguides 30 extends from the free space region 98 and is connected to an optical grating 32. The optical grating 32 comprises a plurality of unequal length waveguides which provides a predetermined amount of path length difference to a corresponding plurality of input waveguides 34 connected to another free space region 46. The free space region 46 is connected to a plurality of output waveguides $4_k$, k=1, 2, ..., N. These frequency routing devices operate as multiplexers and demultiplexers of optical frequencies. For example, if a signal of amplitude A is applied to input waveguide $2_1$ then signals of amplitudes $AT_{11}$, $AT_{12}$, ... $AT_{1N}$ are produced at the output waveguides where $T_{ik}$ is the value of the transmission coefficient for input waveguide $2_i$ and output waveguide $4_k$. Additional details concerning these routing devices are found in the above-referenced patents.

Figure 2:
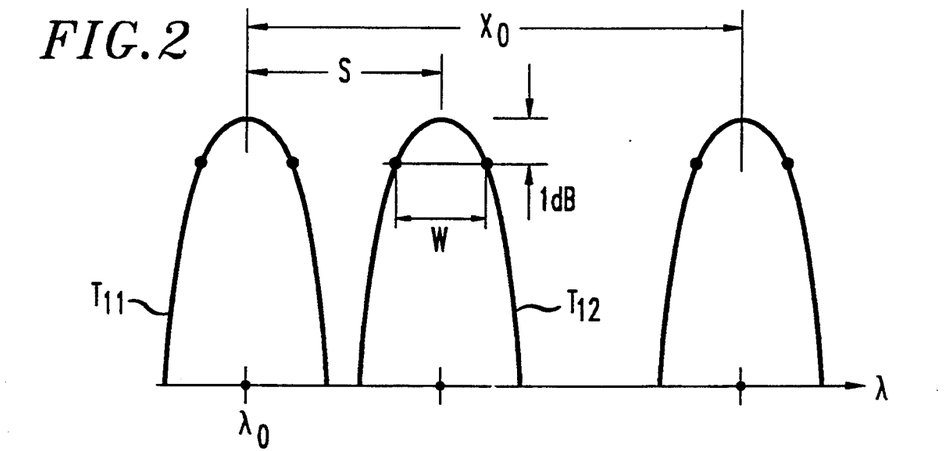
FIG. 2 is a graph showing the transmission coefficients $T_{ik}$ for the routing device of FIG. 1.

The typical behavior of the routing device shown in FIG. 1 is illustrated in FIG. 2. This figure shows the set of transmission coefficients $T_{1k}$ for the routing device for the particular input waveguide $2_1$ as a function of wavelength λ. The variation of each transmission coefficient as a function of wavelength is essentially periodic with a period $X_o$. For a symmetric arrangement in which the input and output waveguides are uniformly positioned within the device's field of view (i.e., the Brillouin Zone), $X_o$ is given by $$X_o = N \cdot S \qquad (1)$$

where N is the total number of input (or output) waveguides and S is the channel spacing, which is defined as the wavelength separation between maximum peaks of adjacent transmission coefficients (see FIG. 2). The wavelength $\lambda_0$ is a wavelength that corresponds to a maximum value for one of the transmission coefficients $T_{ik}$. In FIG. 1, $\lambda_0$ corresponds to a maximum of the coefficient $T_{11}$. All other wavelengths of maximum transmission $\lambda_{ik}$ for the various coefficients $T_{ik}$ essentially differ from $\lambda_0$ by multiples of S and therefore are given by the expression $$\lambda_{ik} = \lambda_o + (i \cdot k + q \cdot N)S \qquad (2)$$

where the integers $i,k = 1, \ldots, N$ specify the locations of the input and output waveguides, q is an integer, and $\lambda_o$ is a wavelength of maximum transmission for the waveguides $i = k = 1$. The wavelength $\lambda_o$ will be referred to as the multiplexer center wavelength. The parameter X is defined as follows:

$$X = \lambda - [\lambda_o + (i \cdot k + q \cdot N)S] = \lambda - \lambda_{ik} \qquad (3)$$

The transmission coefficients have essentially identical behavior and, therefore, they are described by the same function T(X). Thus, all the transmission coefficients corresponding to a particular input waveguide yield an array of equally spaced transmission peaks such as shown in FIG. 2. The spacing of adjacent peaks is equal to the channel spacing S.

In a conventional routing device the channel spacing S is chosen to be large enough to ensure negligible crosstalk between different waveguides. Thus, in the vicinity of a particular wavelength of maximum transmission, for a particular coefficient $T_{ik}$, all other coefficients $T_{ik}$ are negligible. In other words, the various coefficients $T_{ik}$ are typically designed to be essentially non-overlapping, as in FIG. 2.

Generally, in a conventional routing device, energy loss is minimized by insuring a nearly perfect match between each input waveguide and the routing device. In practice, in a symmetric arrangement of the type described in C. Dragone, "An NxN Optical Multiplexer using A Planar Arrangement of Two Star Couplers", *IEEE Photonics Technology Letters*, Vol. 3, No. 9, September 1991, pp. 812-805, this matching condition is satisfied by using identical input and output waveguides. Then, neglecting losses in the routing device, there will be approximately unity transmission at the wavelengths $\lambda_{ik}$. In the following discussion, for the sake of simplicity, losses caused by non-ideal fabrication will be neglected. Accordingly, $$T(0) = 1$$

In order to include losses it is sufficient to multiply T(X) by a suitable coefficient b less than unity.

Figure 6:
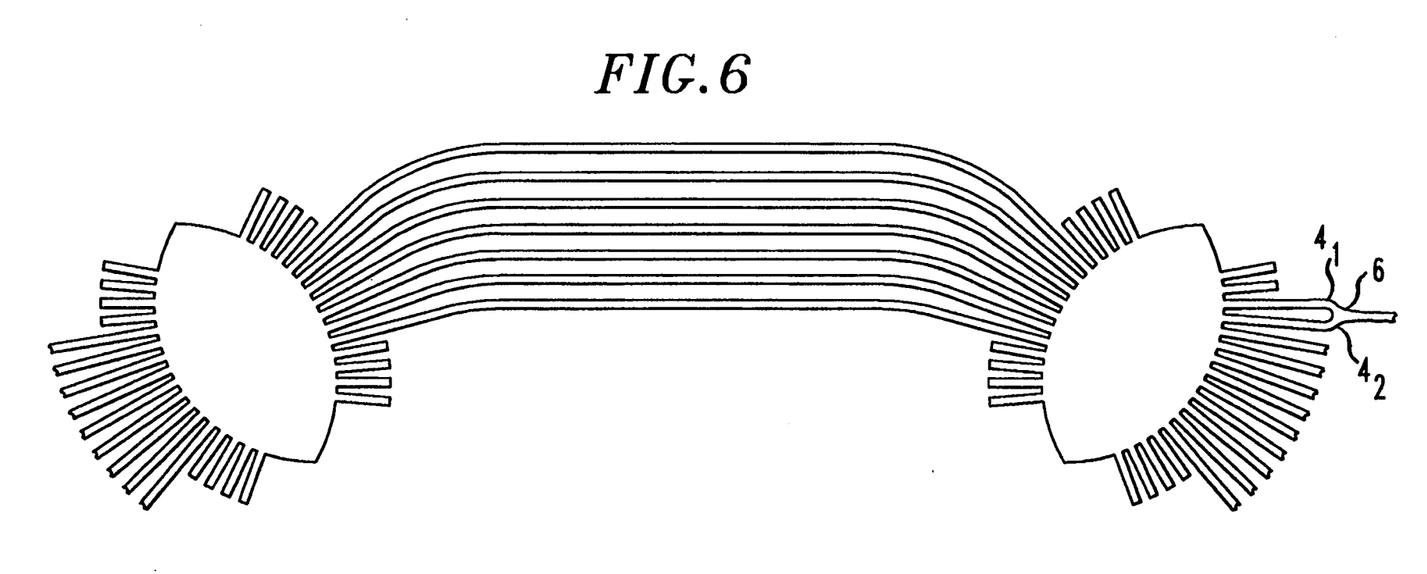
FIG. 6 shows an example of the frequency routing device in accordance with this invention in which two adjacent output waveguides are combined by a coupler.
Figure 10:
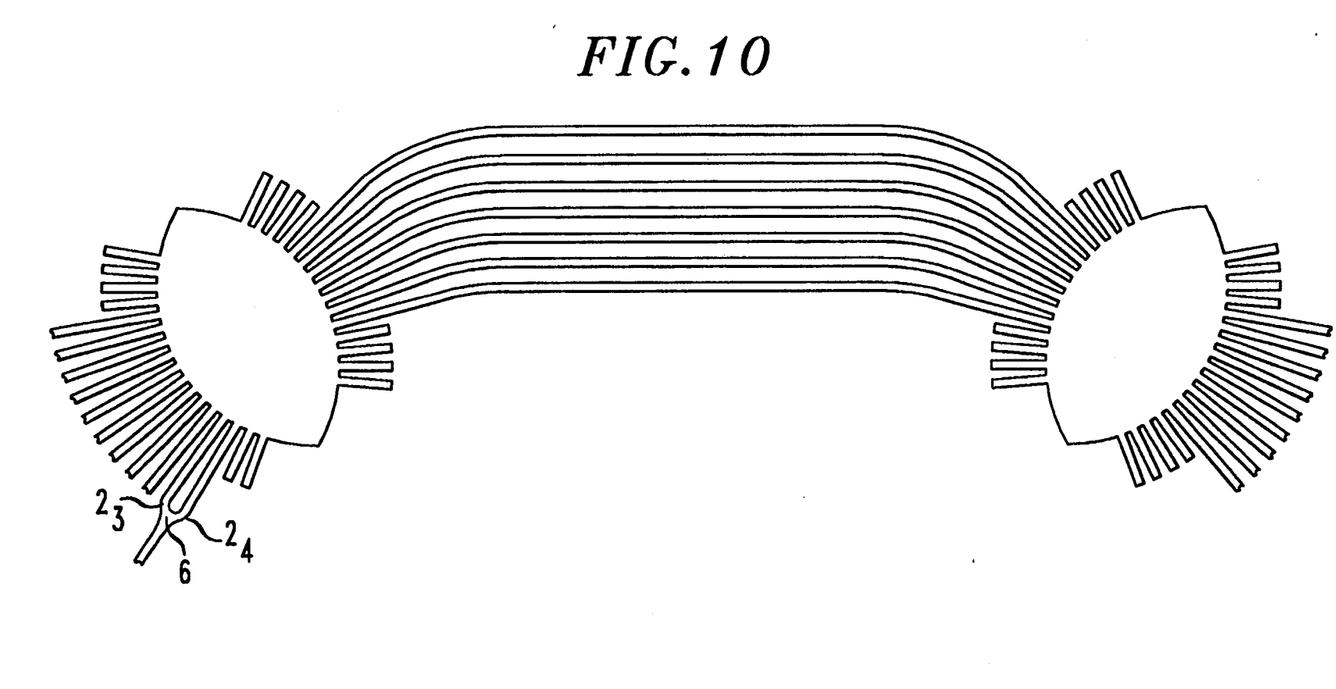
FIG. 10 shows an example of the frequency routing device in accordance with this invention in which two adjacent input waveguides are combined by a coupler.

The above-described conventional routing device has an undesirable feature, namely, that the passband has a width W that is typically much smaller than the channel spacing S, as FIG. 2 indicates. The passband width W over which the transmission coefficient variation remains less than 1 db is typically smaller than the channel spacing divided by 3.0. In accordance with this invention, this limitation can be overcome if the routing device shown in FIG. 1 is modified by coupling together pairs of output waveguides (or, alternatively, input waveguides) so as to produce a substantially flat passband. FIG. 6 shows a routing device in which a pair of adjacent output waveguides $4_3$ and $4_4$ are combined by a Y-branch coupler 6 and FIG. 10 shows a similar arrangement for an adjacent pair of input waveguides.

Figure 3:
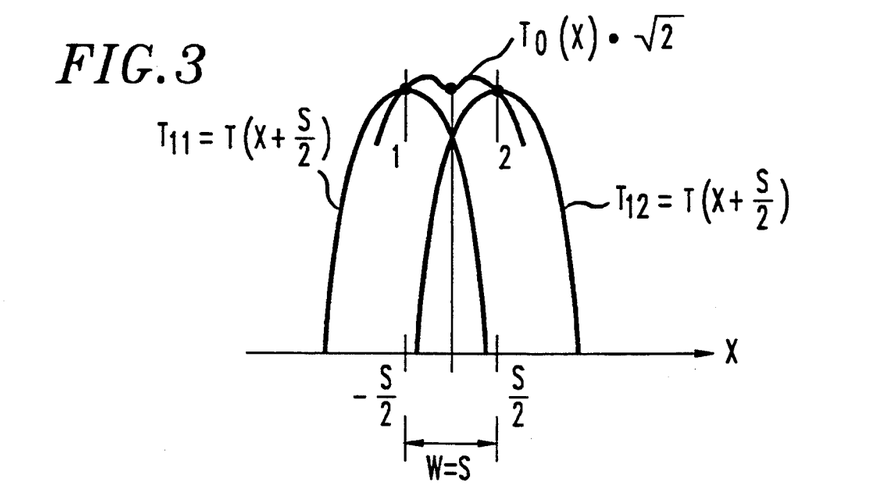
FIG. 3 is a graph showing an example of the net transmission coefficient $T_0(X)$ formed by combining adjacent output waveguides in accordance with this invention.
Figure 4:
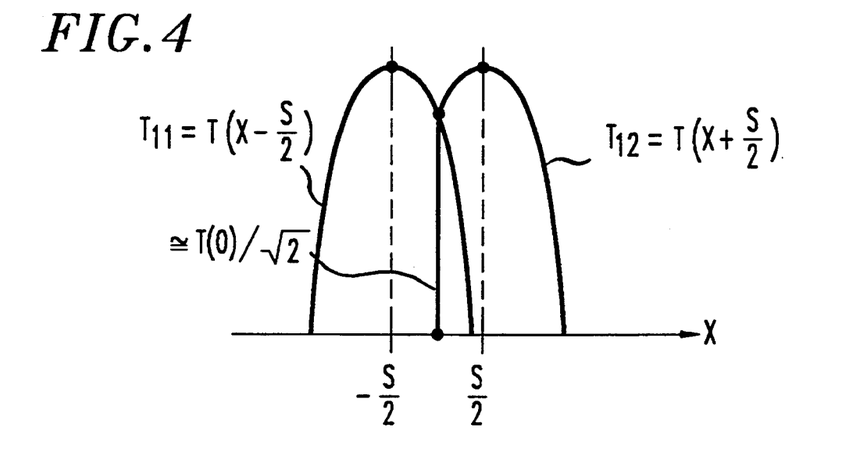
FIG. 4 is a graph showing the transmission coefficients $T_{11}$ and $T_{12}$ when the waveguide spacing between the adjacent waveguides to be combined is relatively small.

To provide a routing device with a relatively wide transmission function such as indicated by the curve $T_0(X)$ shown in FIG. 3, the channel spacing S between the coupled adjacent waveguides should be reduced so as to cause the corresponding transmission coefficients to overlap. Specifically, if output waveguides $k = 1$ and $k = 2$ (e.g., waveguides $4_1$ and $4_2$) are combined as in FIG. 6, the net transmission coefficient $T_0$ is given by the sum of the individual, overlapping coefficients $T_{11}$ and $T_{12}$. Accordingly, by properly selecting the spacing between the coupled waveguides, the coefficient $T_0$ exhibits the desired wide passband W.

It should be noted that if two adjacent output (or input) waveguides are coupled with a Y-branch coupler in accordance with this invention, there will be a loss so that the net transmission coefficient $T_0(X)$ will be less than the sum of the individual transmission coefficients (e.g., $T_{11}$ and $T_{12}$ for the routing device shown in FIG. 6). Specifically, it can be shown that the net transmission coefficient T(0) is described by the relationship:

$$T_o(X) = \frac{T\left(X - \frac{S}{2}\right) + T\left(X + \frac{S}{2}\right)}{\sqrt{2}} \qquad (4)$$

Figure 5A:
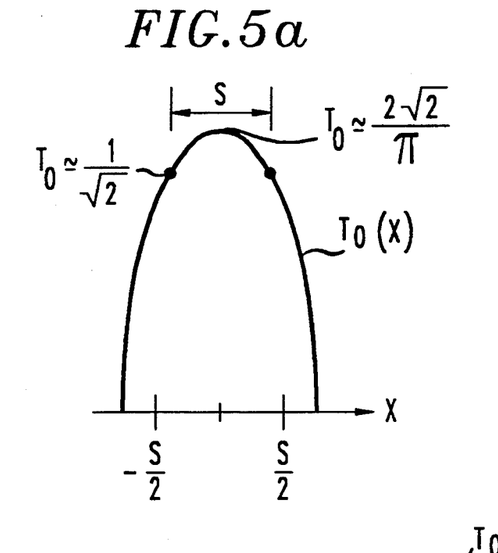
FIG. 5(a) is a graph showing the net transmission coefficient $T_0(X)$ when the waveguide spacing is relatively small and FIG. 5(b) is a graph showing the net transmission coefficient $T_0(X)$ when the waveguide spacing is increased so that a substantially flat passband results.
Figure 5B:
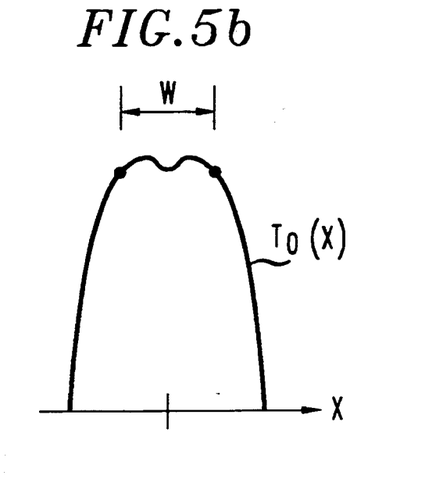

The following discussion will set forth in greater detail the conditions producing a routing device with the desired wide passband behavior shown in FIG. 3. It is well-known that the channel spacing S is linearly related to the waveguide spacing s as follows:

$$S = cs \qquad (5)$$

where c is a constant that depends on the multiplexer design parameters. When the waveguide spacing s is very small so that the waveguides are strongly coupled, the adjacent transmission coefficients (e.g., $T_{11}$ and $T_{12}$ for the routing device of FIG. 6) have the behavior illustrated in FIG. 4. At the wavelength corresponding to $-S/2$ most of the power supplied to the input waveguide is transferred to the output waveguide corresponding to $k = 1$. At the wavelength corresponding to $+S/2$ most of the power supplied to the input waveguide is transferred to the output waveguide corresponding to $k = 2$. At the intermediate wavelength (i.e., $X = 0$) approximately half of the power is transferred to each of the output waveguides $k = 1$ and 2. The value of each of the transmission coefficients at this intermediate wavelength is approximately T(0)/2. It therefore follows from equation 4 that when the combined waveguides are closely spaced the combination of the two transmission coefficients $T_{11}$ and $T_{12}$ has the behavior illustrated in FIG. 5(a). In this case $T_0(X)$ does not exhibit a flat passband but has a maximum value at $X = 0$ and substantially lower values at $X = \pm S/2$. However, a substantially flat passband can be obtained by making the waveguide spacing s sufficiently large to produce two distinct transmission maxima separated by a minimum at $X=0$, as indicated in FIG. 5(b). The ratio between the maximum and minimum transmission values within the passband can be chosen to have any desired value by properly choosing the waveguide spacing s between the waveguides coupled by the Y-branch coupler. For example, the particular behavior illustrated in FIG. 3 is obtained by choosing the waveguide spacing s so that $$T(S/2) \simeq T(0)/2$$

Figure 9:
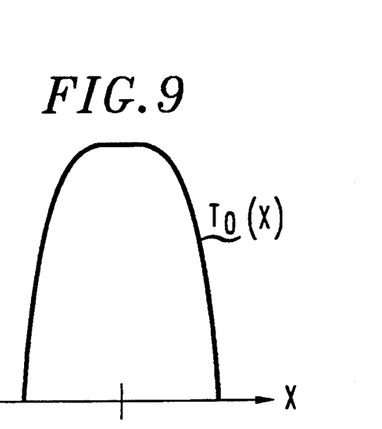
FIG. 9 is a graph showing an example of a substantially flat net transmission coefficient produced by the routing device in accordance with this invention.

This equation states that to obtain a substantially flat passband each of the individual transmission coefficients at the intermediate wavelength ($X=0$) must be approximately one half its maximum value. For this particular waveguide spacing the passband width W is equal to S and it can be shown that the two transmission maxima occur approximately at $$X = \frac{W}{2\sqrt{2}} \quad (6)$$

and their values are close to $1.05 \, |T(0)|^2$. Notice, by properly decreasing the spacing so as to cause $$\frac{\delta^2 T}{\delta X^2} = 0 \text{ for } X = 0, \quad (7)$$

a maximally flat passband can be obtained as seen in FIG. 9

Figure 7:
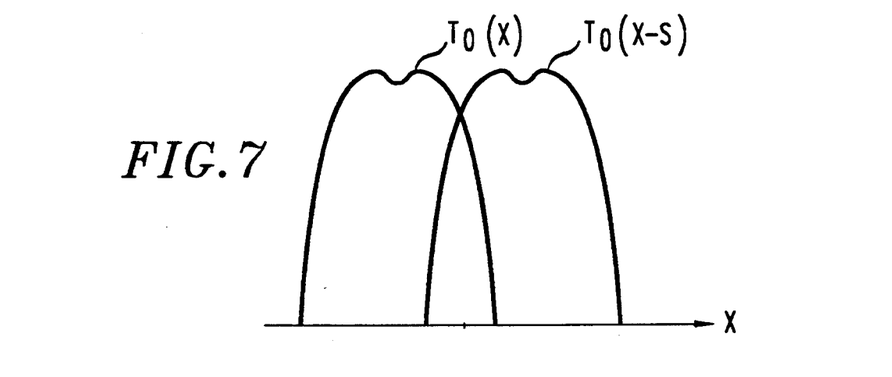
FIG. 7 shows a graph of the set of transmission coefficients $T_0(X-(i-1)S)$ for the frequency routing device shown in FIG. 6.

The transmission coefficient $T_0(X)$ shown in FIG. 3 is produced by the routing device shown in FIG. 6 between the input waveguide corresponding to $i=1$ and the output of the Y-branch coupler 6. The transmission coefficient between all other input waveguides and the Y-branch coupler 6 is obtained by displacing $T_0(X)$ by an integer multiple of S. Specifically, the set of coefficients $T_0(X-(i-1)S)$ for all the plurality of input waveguides and the output of the Y-coupler 6 is illustrated in FIG. 7.

Figure 8:
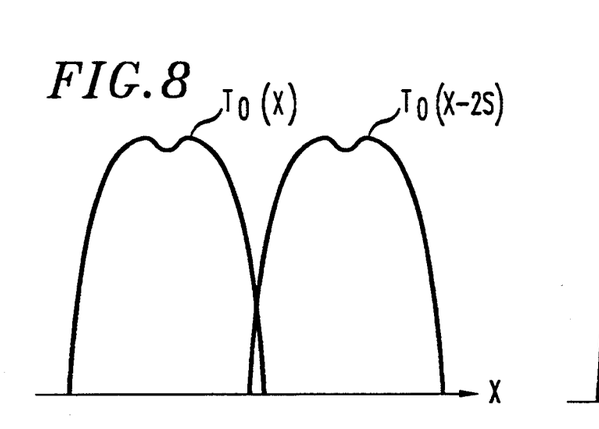
FIG. 8 shows a graph of the set of transmission coefficients $T_0(X-(i-1)S)$ for the frequency routing device shown in FIG. 6 when only every third input waveguide is employed.

For many applications the routing device of this invention should be configured to ensure negligible crosstalk between adjacent waveguides. In other words, the routing device should ideally produce over the entire passband of each transmission coefficient seen in FIG. 7, negligible values for all other coefficients. Clearly, the set of transmission coefficients seen in FIG. 7 do not satisfy this condition. However, this condition can be met by using only every third input waveguide. Since in this case only a fraction of the input waveguides are used, the unused waveguides may be removed and the spacing between the remaining waveguides can be then somewhat reduced without causing substantial crosstalk. FIG. 8 shows an example of the behavior of the routing device of FIG. 6 when only every third input waveguide is used.

A problem with the conventional design of a routing device is that it is difficult to control the fabrication process to within the required accuracy for the center wavelength $\lambda_0$, which is often a fraction of a nanometer. It is thus desirable to design a routing device in which the values of $\lambda_0$ can be selectively chosen. For the sake of clarity this problem will be addressed below in terms of a demultiplexer. However, the same considerations apply equally to a multiplexer and a routing device generally. If the demultiplexer must demultiplex a signal composed of N channels centered at the wavelengths, $$S_0, S_0+S, \ldots, S_0+(N-1)S$$

the demultiplexer must separate the N channels and transmit each of them to a separate output waveguide.

To obtain a properly located center wavelength $\lambda_0$ for a demultiplexer such as shown in FIG. 10, several pairs of adjacent input waveguides are coupled by Y-branch couplers. The various pairs are properly spaced apart from one another so as to produce different values for the center wavelength $\lambda_0$ for each of the pairs. Moreover, as will be discussed in more detail below, additional values of the center wavelength $\lambda_0$ can be produced by interleaving additional output waveguides between the initial set of output waveguides.

As noted earlier, the wavelengths of maximum transmission are determined by the locations of the input and output waveguides on the input and output circles of the two free space regions. In the particular case of the routing device shown in FIG. 1, which consists of a symmetric arrangement of equally spaced input and output waveguides, all wavelengths of maximum transmission are displaced from the center wavelength $\lambda_o$ by multiples of S. Thus, consider N such wavelengths, $$\alpha, \alpha+S, \alpha+2S, \ldots, \alpha+(N-1)S \quad (8)$$

where $\alpha = \lambda_o$, and let an input signal consisting of N channels centered at these wavelengths be applied to one of the input waveguides, for instance $i=1$. The routing device will then transmit each wavelength to a different output waveguide. However, the same result will be obtained if the input signal is applied to a different input waveguide, since each of the N transmission coefficients corresponding to any particular input waveguide will produce maximum transmission at one of the above wavelengths. For instance, the coefficients corresponding to the input waveguide $i=2$ are obtained from those for $i=1$ by simply applying signal A to waveguide $i=2$ instead of $i=1$ and replacing in FIG. 2:

$$T_{11} \to T_{2N}, T_{12} \to T_{21}, \ldots, T_{1N} \to T_{2,N-1} \quad (9)$$

Accordingly, the only difference between the transmission coefficients when the signal is applied to $i=2$ instead of $i=1$ is a cyclic permutation of the wavelengths of maximum transmission. In either case, the arrangement of FIG. 1 will demultiplex the N channels and transmit them to separate output waveguides.

The value of $\alpha$ for each input waveguide can be changed without affecting the channel spacing S by slightly displacing the location of each input waveguide from the particular location producing $\alpha = \lambda_o$. As a result, the arrangement of FIG. 1 is now characterized by different values of $\alpha$ $$\alpha = \alpha_i (i=1,2,\text{etc.}) \quad (10)$$

for each of the input ports $i=1, 2, \ldots, N$, where $\alpha_i$ now differs from $\lambda_o$ because of the i-the waveguide displacement.

Figure 13:
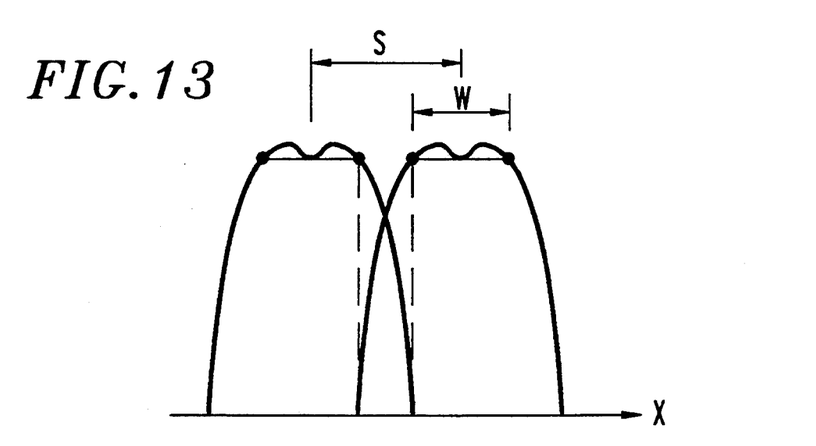
FIG. 13 is a graph of the transmission coefficient $T_0(x)$ for a demultiplexer in accordance with this invention when the waveguide spacing is minimized so that the spectral efficiency is maximized.
Figure 14:
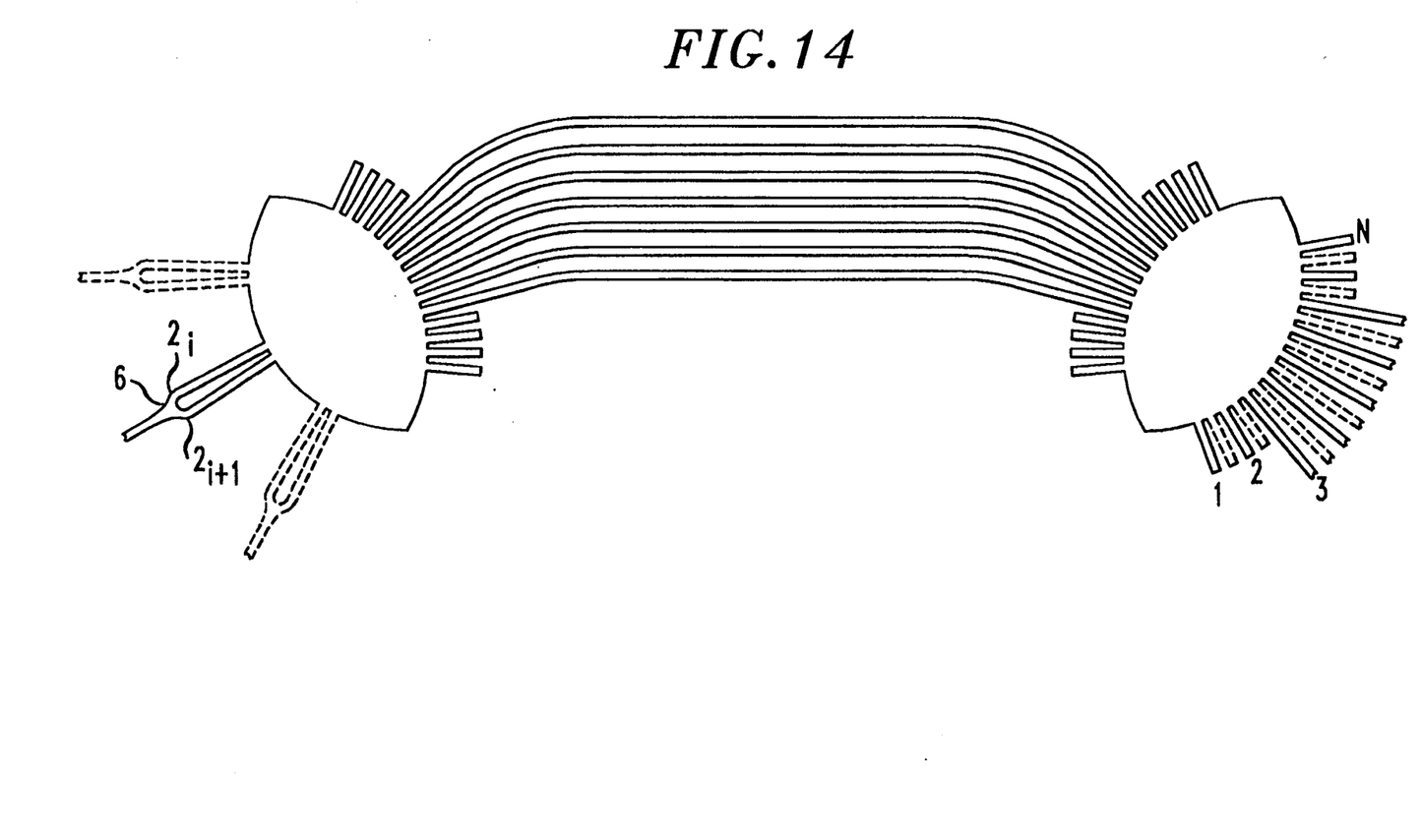
FIG. 14 shows the demultiplexer producing the behavior illustrated in FIG. 13.

The above considerations have shown that it is possible to produce a demultiplexer with a set of distinct values of $\alpha$ by properly displacing the input waveguides. Consider, for instance, a demultiplexer in accordance with this invention such as shown in FIG. 14 having a single pair of adjacent input waveguides $2_i$ and $2_{i+1}$ connected to a Y-branch coupler 6 and let $\alpha = \lambda_o$. Let the initial N output waveguides be properly spaced to insure negligible cross-talk between adjacent waveguides. For most applications it is important to minimize the waveguide spacing so as to maximize spectral efficiency, which is determined by the ratio $$S/W \qquad (11)$$

where S is the channel spacing and W is the passband width. This arrangement yields the typical behavior shown in FIG. 13, where each transmission coefficient produces negligible transmission at all wavelengths corresponding to the adjacent passbands and the channel spacing has the smallest value that can be chosen without causing substantial crosstalk.

The demultiplexer arrangement of FIG. 14 may be modified to produce additional choices for the value of $\alpha$. The output waveguide spacing producing the set of coefficients shown in FIG. 13 can be shown to be large enough to allow an additional set of N output waveguides to be included by interleaving the two sets as indicated by the dashed lines shown at the output of the multiplexer seen in FIG. 14. This yields a multiplexer with two sets of output waveguides spaced s/2 apart which provide the following two choices for $\alpha$:

$$\lambda_o, \lambda_o + S/2 \qquad (12)$$

Additional waveguides are then included at the input of the demultiplexer. For example, N—2 additional input waveguides may be added with a waveguide spacing of S+S/(N-1), as indicated by the dashed lines shown at the input of the multiplexer shown in FIG. 14. The resulting multiplexer has, in addition to the above two choices for $\alpha$, the following additional choices:

$$\lambda_o + \frac{S}{N-1}, \lambda_o + \frac{S}{2} + \frac{S}{N-1} \text{ etc.} \qquad (13)$$

Thus, by properly selecting the input and output waveguides, the wavelength $\alpha$ now can be changed in increments of $$\frac{S}{2(N-1)} \qquad (14)$$

assuming that N is even. This enhanced flexibility in design is particularly advantageous because it is generally difficult with current technologies, such as SiOB or InP, to control the center wavelength $\lambda_o$ with the accuracy (i.e., a fraction of a nanometer) that is typically required for long haul and local area networks. As noted earlier, the above technique first discussed for a demultiplexer in which adjacent input waveguides are connected by a Y-branch coupler also clearly applies to a multiplexer in which the adjacent output waveguides are connected by a Y-branch coupler.

Notice that the total number of wavelengths $\alpha$ that can be produced in an interval of width S in the above example is $$2(N-1) \qquad (15)$$

For a 4×1 multiplexer, for instance, the total number of wavelengths is 6.

In configuring the demultiplexer in the manner set forth above it was assumed that a single input waveguide (i.e., the waveguide with a value of $\alpha$ closest to the specified value $\alpha_0$) was needed and that the passbands should be spaced an equal distance apart. However, the above considerations apply in general without these restrictions. Moreover, by reversing the direction of transmission, they apply to a multiplexer as well.

The technique described herein substantially increases the passband width by combining two input (or output) waveguides as illustrated in FIGS. 6 and 10. By properly selecting the spacing between the two waveguides the desired value for the passband width can be chosen. Moreover, if the input waveguides width also is properly chosen as discussed below, the desired passband width will be produced with minimal loss at two preselected wavelengths close to the passband edge.

Figure 11:
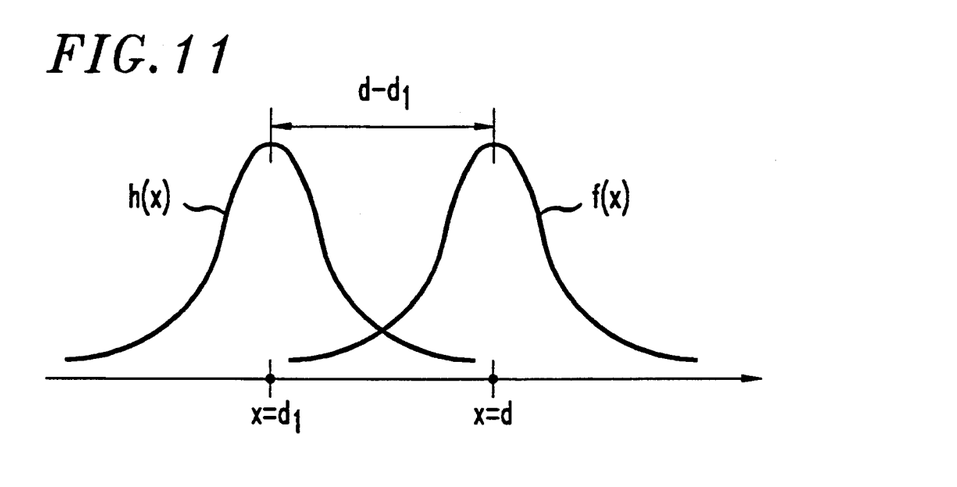
FIG. 11 is a graph showing an image f(x) appearing on the output free space region of the routing device shown in FIG. 1 and the corresponding mode h(x) for a particular output waveguide.

Before discussing the optimal waveguide width for the routing device of this invention, the conditions that optimize the transmission coefficients between two particular waveguides for the conventional routing device shown in FIG. 1 will be presented. The routing device of FIG. 1 can be viewed as an imaging apparatus that transforms the signal illuminating the input circle of the input free space region into a corresponding image f(x) appearing on the output free space region. As indicated in FIG. 11, the location x=d, where d denotes the distance along the output circle corresponding to the center of this image is a function of the wavelength $\lambda$. Therefore, the location x=d is in general displaced from the location x=$d_1$ of the mode h(x) for the particular output waveguide under consideration. The displacement d-$d_1$ between h(x) and f(x) is essentially a linear function of $\lambda$ and maximum transmission will be produced at the wavelengths for which d=$d_1$. At these wavelengths, the power transmission coefficient will be close to unity, since the routing device losses are small and since the input and output waveguides in FIG. 1 are of essentially the same dimensions and, thus, they essentially produce identical distributions f(x) and h(x). At a wavelength for which d≠$d_1$, on the other hand, the displacement will produce a mismatch loss. The variation in the loss as a function of wavelength can be determined by well known methods, by taking into account that the displacement d-$d_1$ varies linearly with $\lambda$ in a properly chosen interval corresponding to a period $X_o$. Thus, by calculating the coupling coefficient between the two distributions, the wavelength dependence of the transmission coefficient T(X) can be obtained.

Next consider, instead of the arrangement of FIG. 1, the arrangement of FIG. 10 where a pair of input waveguides are connected by a Y-branch coupler.

Figure 12:
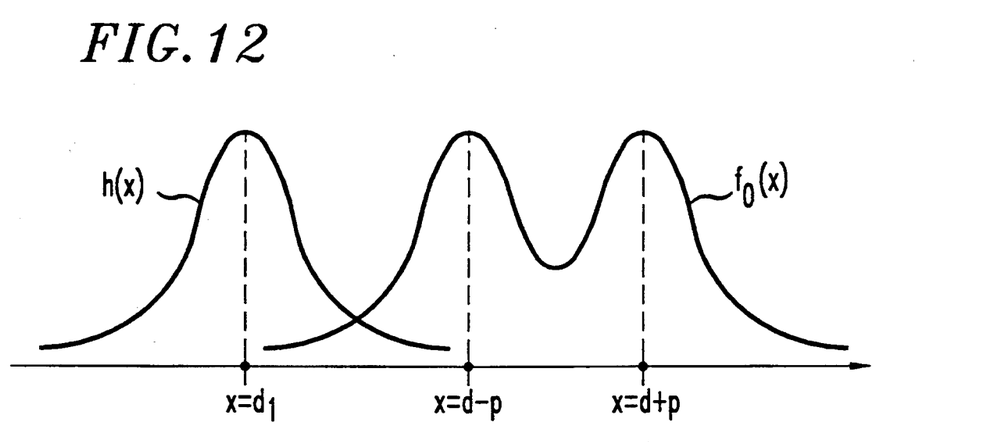
FIG. 12 is a graph showing an image $f_0(x)$ appearing on the output free space region of the routing device of this invention for a sufficiently large waveguide spacing.

If the separation s between the two adjacent waveguides that are coupled together is sufficiently large, then instead of the distribution f(x) the distribution shown in FIG. 12 $f_0(x)$ results:

$$f_o(x) \approx \frac{1}{\sqrt{2}} [f(x-p) + f(x+p)] \qquad (16)$$

where p=s/2, and the coupling coefficient between $f_o(x)$ and the output mode h(x) now produces two maxima, approximately for x=d+p and x=d—p. The values of the two maxima (more precisely, the sum of their squares) can be maximized by properly choosing the widths of the two waveguides. The result of this procedure is that the optimum width is obtained when $f_o(x)$ approximately matches the distribution $$\tfrac{1}{2}[h(x-p)+h(x+p)] \quad (17)$$

This will maximize the transmission coefficient at the two wavelengths corresponding to $x=d+p$ and $d-p$. Moreover, if the spacing s is sufficiently large so that mutual coupling between the two waveguides is small, the above condition will be satisfied by simply choosing $h(x)=f(x)$. Notice that the value of p need not coincide with s/2. Thus, by the above procedure, by properly choosing the value of s one can in general maximize the transmission coefficient at two preselected wavelengths close to the bandpass edges. Accordingly, the desired passband width with maximum efficiency can be obtained by properly choosing the spacing of the two waveguides, and optimizing their width by the above procedure.

As an example, a flat passband characterized by the condition:

$$T_o(W/2) \neq T_o(O) \quad (18)$$

can be approximately produced by approximating the mode $h(x)$ with a Gaussian distribution. By the above procedure it is determined that $T(X)$ is also Gaussian:

$$T(X) \approx \exp\left[-\left(\frac{X}{v}\right)^2\right] \quad (19)$$

and the parameter $v$ producing condition (18) is $$2v = 0.906 W \quad (20)$$

The corresponding efficiency is given by $$0.54369|T(o)|^2 \quad (21)$$

where $T(X)$ denotes the routing device transmission coefficient that would have been obtained without using this optimization technique but rather by using a single input waveguide with $f(x)=h(x)$. The above efficiency is not much different from the value $$0.5|T(o)|^2 \quad (22)$$

obtained previously.

An important conclusion implied by the above optimization procedure is that the optimum routing device design producing a flat passband with minimal loss is approximately obtained by combining two output waveguides to produce two displaced replicas of the mode of the input waveguide, as shown by Eq. (1). This is simply the technique described initially in which two input or output waveguides are connected by a Y-branch coupler. The higher efficiency obtained by the above optimization procedure is a consequence of the Gaussian approximation used for $h(x)$.

I claim:

1. An optical apparatus comprising:
   a first plurality of waveguides;
   a first free space region connected to the first plurality of waveguides;
   a second plurality of waveguides connected to the first free space region;
   an optical grating connected to the second plurality of waveguides comprising a plurality of unequal length waveguides;
   a third plurality of waveguides connected to the optical grating;
   a second free space region connected to the third plurality of waveguides; and
   at least one waveguide connected to the second free space region;
   wherein said first plurality of waveguides includes at least two adjacent waveguides having ends remote from the first free space region; and
   a Y-branch coupler connected to the remote ends of the two adjacent waveguides, said adjacent waveguides being located a predetermined distance apart along the first free space region to produce a specifiable passband width.

2. The apparatus of claim 1 wherein the predetermined distance is maximized to maximize the passband width without exceeding a preselected variation in transmission over the passband width.

3. The apparatus of claim 1 wherein said first plurality of waveguides further includes at least two additional adjacent waveguides having ends remote from the first free space region and a second Y-branch coupler coupled to the ends of the adjacent waveguides.

4. The apparatus of claim 2 wherein said at least one waveguide connected to the second free space region further comprises a fourth plurality of waveguides.

5. The apparatus of claim 4 wherein said fourth plurality of waveguides are each located a predetermined distance apart from one another along the second free space region to determine a specifiable center wavelength and a specifiable channel spacing providing a first set of wavelengths of maximum transmission.

6. The apparatus of claim 5 further comprising a fifth plurality of waveguides interleaved between the fourth plurality of waveguides to provide a second set of wavelengths of maximum transmission.

7. The apparatus of claim 1 wherein the width of the two adjacent waveguides has a value maximizing transmission at two preselected wavelengths near respective edges of the passband.

* * * * *